United States Patent [19]
Woo et al.

[11] Patent Number: 5,450,344
[45] Date of Patent: Sep. 12, 1995

[54] GPS RECEIVERS WITH DATA PORTS FOR THE UPLOADING AND DOWNLOADING OF ABSOLUTE POSITION INFORMATION

[75] Inventors: Arthur Woo, Cupertino; David S. Sprague, Portola Valley, both of Calif.

[73] Assignee: Trimble Navigation Limited, Sunnyvale, Calif.

[21] Appl. No.: 232,830

[22] Filed: Apr. 22, 1994

[51] Int. Cl.⁶ .............................................. G06F 19/00
[52] U.S. Cl. .................... 364/449; 73/178 R
[58] Field of Search ........................ 364/449, 444, 443; 73/178 R; 434/239; 342/450, 451, 357; 395/275

[56] References Cited

U.S. PATENT DOCUMENTS

| | | | |
|---|---|---|---|
| 4,785,463 | 11/1988 | Janc et al. | 375/1 |
| 5,153,836 | 10/1992 | Fraughton et al. | 364/461 |
| 5,202,829 | 4/1993 | Geier | 364/449 |
| 5,214,757 | 5/1993 | Mauney et al. | 395/161 |
| 5,294,937 | 3/1994 | Ostteen et al. | 342/459 |

OTHER PUBLICATIONS

Trimble Navigation SCOUT Brochure for Handheld Portable GPS Receiver.
Application and Technical Notes for SCOUT GPS Copyright 1993.

*Primary Examiner*—Kevin J. Teska
*Assistant Examiner*—Susan Wieland
*Attorney, Agent, or Firm*—Thomas E. Schatzel

[57] ABSTRACT

A GPS receiver comprises a data input/output port for communication of datum-less position fixes in an earth-centered, earth-fixed (ECEF) coordinate style to avoid the errors associated with not communicating the datum choice with latitude longitude data communication formats.

8 Claims, 2 Drawing Sheets

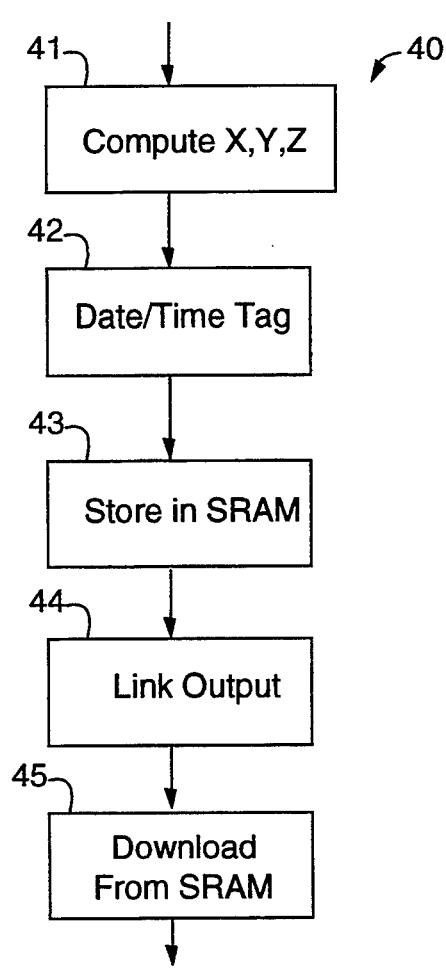
Fig. 3
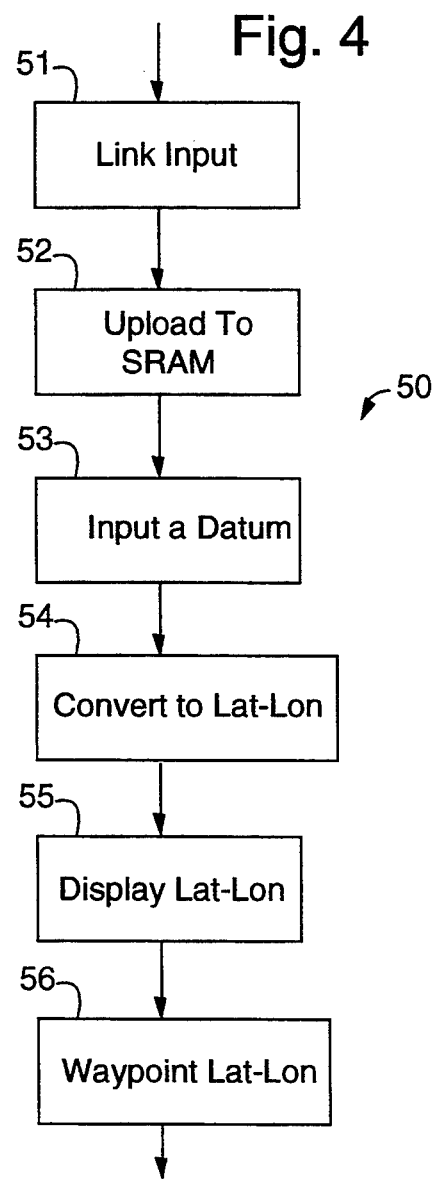
Fig. 4
Fig. 5
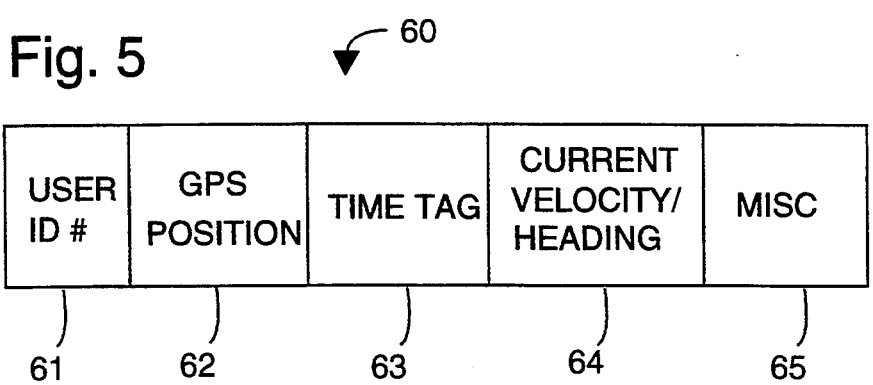

GPS RECEIVERS WITH DATA PORTS FOR THE UPLOADING AND DOWNLOADING OF ABSOLUTE POSITION INFORMATION

BACKGROUND OF THE INVENTION

1. Field of the Invention

The invention relates generally to navigation and more specifically to equipment and methods for communicating earth position data to and from a GPS receiver.

2. Description of the Prior Art

Automatic piloting of ships and boats has been traditionally based on magnetic compass or wind direction. Flux-gate compasses, for example, are widely used in auto-tillers for sailboats. A servo system is employed to keep the boat's heading fixed relative to the earth's magnetic poles. Mechanical rudders combined with wind vanes have long been used to steer sailboats to maintain a particular attack angle of the boat into the wind, or windpoint.

Recent developments in satellite-based navigation systems have allowed global positioning system (GPS) to be adapted to ship and small boat automatic piloting. Several manufacturers of such equipment in the United States have joined with one another to standardize the format of data output from GPS system equipment so that charting and piloting equipment can be mixed and matched with various GPS receivers.

The typical format offered commercially in the United States is promulgated by the National Electronic Marine Association (NEMA), and involves the communication of position expressed in latitude and longitude. However, the use of latitude and longitude implies the use of a datum which also must be communicated, or at least agreed upon. Typical datums in use in the United States are "WGS-84" for road maps and "AND-27" for topographical maps. In Japan, the old "Tokyo Datum" is in common usage. Unfortunately, datums are not readily, or commonly, automatically communicated between instruments.

Numerous datums are in common usage throughout the world. Therefore, portable hand-held GPS receivers are conventionally programmed to offer a variety of standard datums and even a few custom datums. For example, the SCOUT TM, as marketed by Trimble Navigation, Ltd. (Sunnyvale, Calif.), has 123 datums and two custom datums in its memory that can be selected from a user menu which is presented on a display screen.

The upload and download communication of latitude and longitude information between a computer and a portable GPS receiver can therefore be undesirable and a better method and apparatus are needed for the accurate exchange of position information between navigation instruments.

SUMMARY OF THE PRESENT INVENTION

It is therefore an object of the present invention to provide a GPS receiver that can input and output with a main computer a collection of positions gathered over time in an earth-centered, earth-fixed format.

It is another object of the present invention to provide a GPS receiver that can convert earth-centered, earth-fixed information to and from latitude and longitude formats with their appropriate datums.

Briefly, a GPS receiver embodiment of the present invention comprises a GPS receiver with a data input/output port for communicating position information in an earth-centered, earth-fixed format.

An advantage of the present invention is that a GPS receiver is provided that communicates position determinations without degrading the accuracy by eliminating the datum-loss source of error.

Another advantage of the present invention is that a GPS receiver is provided that removes a stumbling block that is created when datums are used and need to be communicated.

A further advantage of the present invention is that a GPS receiver is provided with an input/output port that retains any date and time stamp information often associated with position determinations, and therefore is more useful in archiving data for later analysis.

These and other objects and advantages of the present invention will no doubt become obvious to those of ordinary skill in the art after having read the following detailed description of the preferred embodiment which is illustrated in the drawing figures.

IN THE DRAWINGS

FIG. 3 is a flowchart diagram of a computer-implemented method for position determination and time tagging data for output for the GPS receiver of FIG. 1;

FIG. 4 is a flowchart diagram of a computer-implemented method inputting position data to the GPS receiver of FIG. 1; and FIG. 5 is a diagram of a format used for the communication of position data through the data input/output port of the GPS receiver of FIG. 1.

DETAILED DESCRIPTION OF THE PREFERRED EMBODIMENT

Figure 1:
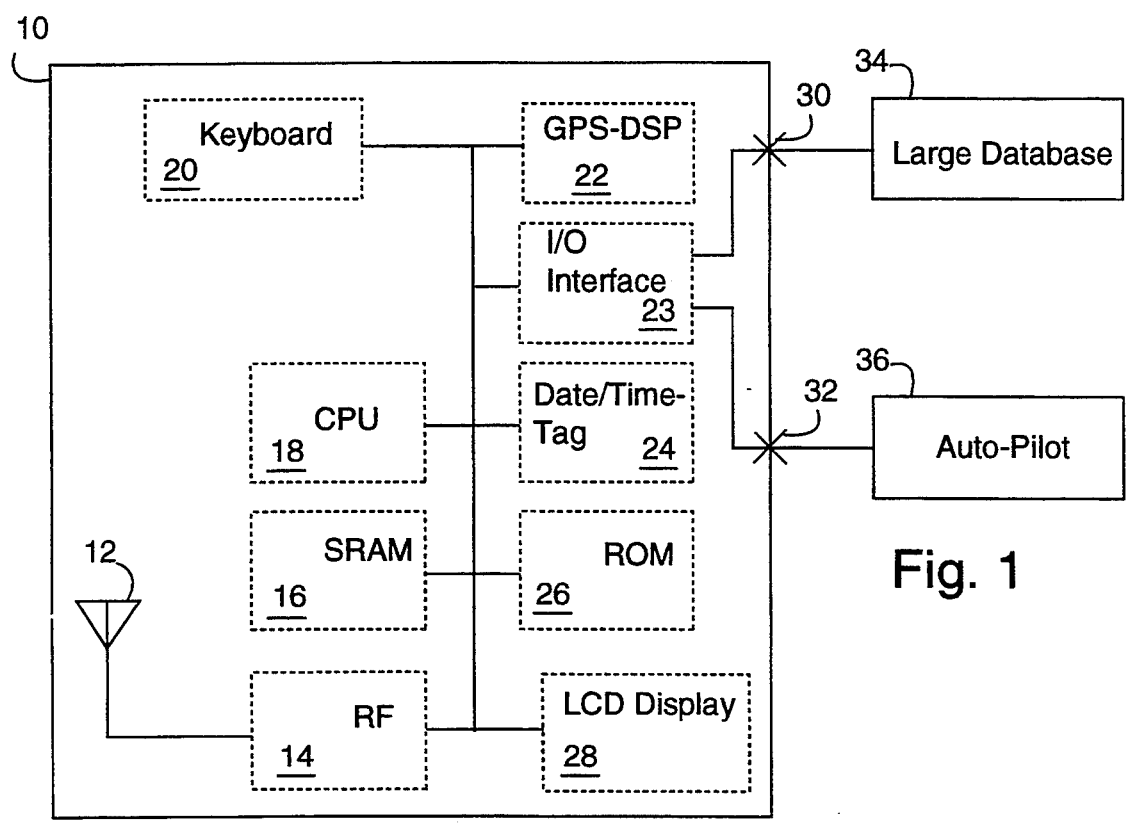
FIG. 1 is a block diagram of a GPS receiver embodiment of the present invention.
Figure 2:
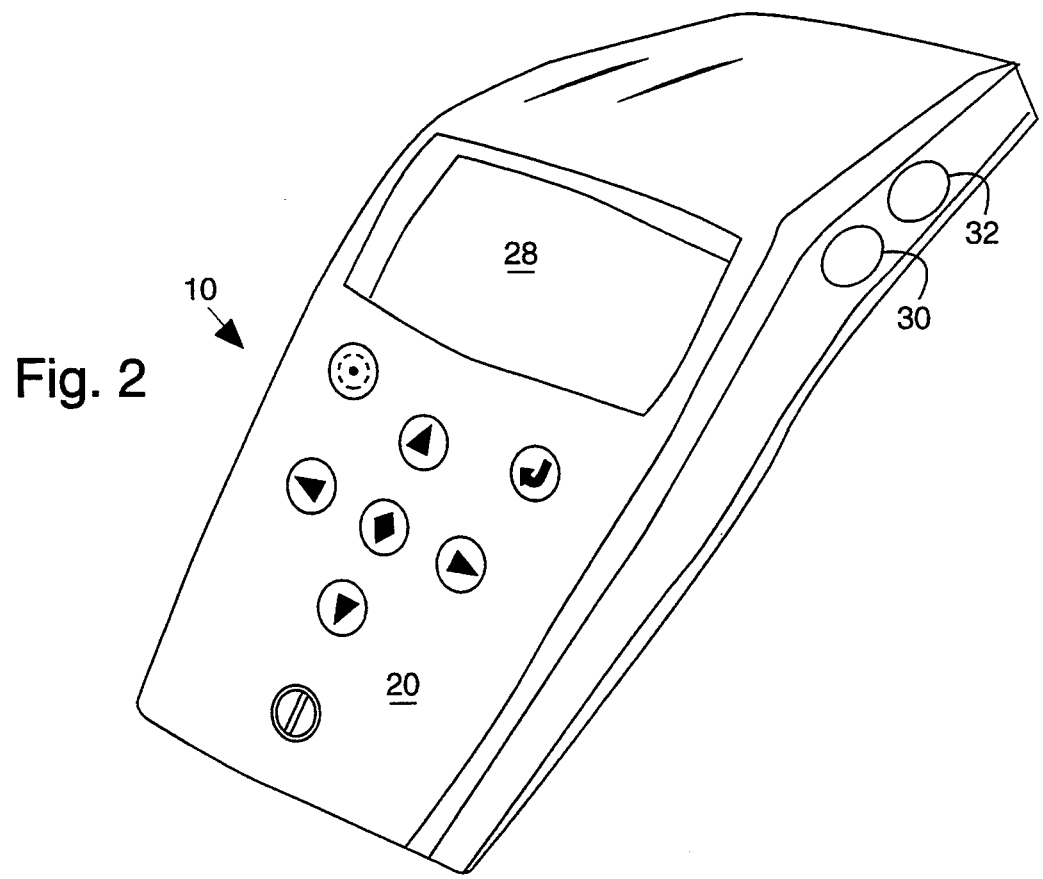
FIG. 2 is a perspective view of the GPS receiver of FIG. 1.

FIGS. 1 and 2 illustrate a global positioning system (GPS) receiver embodiment of the present invention, referred to herein by the general reference numeral 10. GPS receiver 10 comprises an antenna 12 to receive radio signals from orbiting GPS satellites, a radio frequency (RF) stage 14 to amplify and downconvert such GPS radio signals, a static random access memory (SRAM) 16, a microprocessor (CPU) 18, a keyboard 20, a GPS digital signal processor (GPS-DSP) 22, an input/output (I/O) interface 23, a date/time-tag unit 24, a read only memory (ROM) 26 and a liquid crystal display (LCD) 28. A pair of data input/output (I/O) ports 30 and 32 provide external interfaces, for example, to a large database 34 and/or an auto-pilot 36. The database 34 can contain, for example, the complete telephone YELLOW PAGE listings for an area or the country. The I/O ports 30 and 32 may be separate or combined into a single connector. SRAM 16 has a capacity of 64K 15 bytes and ROM 26 stores eight megabytes. ROM 26 has machine code programmed into it that embodies an operating system for user communication via the keyboard 20 and the LCD 28.

The antenna 12 receives range information from orbiting GPS satellites and sends its amplified signals to the GPS-DSP 22. The CPU 18 helps decode the signals received and converts the information under a program stored in ROM 26 into earth-centered, earth-fixed (ECEF) position determinations which are temporarily stored in SRAM 16. The date/time-tag unit 24 associates a date and/or time tag with each such position determination stored in SRAM 16.

As shown in FIG. 3, the ROM 26 further includes an application program 40, diagrammed in FIG. 3. In a step 41, the ECEF coordinate information (x,y,z) is computed. A date and/or time tag with GPS-time and GPS-week may be associated with each position determination in a step 42 to allow later analysis and comparison, especially after uploading to the large database 34. The time-tagged and/or date-stamped data is stored in the SRAM 16 as it is collected in real-time by a step 43. A step 44 establishes a communication link-up through I/O port 30 to the large database 34. A step 45 downloads the time-tagged and/or date-stamped data stored in the SRAM 16 to the large database 34.

The data I/O port 30 allows for a two-way data connection with a GPS receiver 10. A commercially available GPS receiver that can be used as a basis for GPS receiver 10 is marketed as the SCOUT by Trimble Navigation (Sunnyvale, Calif.). A microcomputer, such as the 68000 marketed by Motorola (Phoenix, Ariz.), may be used to implement CPU 18 to generate and recognize alphanumeric user ID codes, to frame and de-frame message packets shipping out and coming in, and to do message protocol and error detection and correction for message frames.

As shown in FIG. 4, ROM 26 further includes a computer-implemented process 50 for uploading position data from the large database 34 in an ECEF coordinate style. A step 51 establishes the communication protocol link-up. A step 52 moves data in ECEF format from I/O port 30 to the SRAM 16. A step 53 accepts a datum selection from a user from the keyboard 20. A step 54 converts the ECEF coordinate style to a latitude-longitude coordinate style expressed in the datum chosen by the user. Alternatively, a default to WGS-84 can be allowed. In a step 55, the datum selection results in a display on the LCD 28, e.g., as a waypoint or a goal with a step 56. The uploaded ECEF coordinate style data, however, is retained in its unconverted state within SRAM 16 together with any date-stamps or time-tags.

An exemplary message frame 60 communicated over the I/O ports 30 and 32 is illustrated in FIG. 5. Four hundred bits of data are divided into several fields. Other frame lengths are possible, nevertheless, a 400-bit frame sent at 1200 baud is expected to give good results. A user ID field 62 uniquely identifies GPS receiver 10 alphanumerically to large database 34. A GPS position field 62 communicates the navigation position fix information that has been determined by the GPS receiver 10 identified in field 61. A time tag field 63 permits the information in field 61 to be dated and thus coordinated when in receipt by other large database 34. A field 64 communicates the velocity and heading of the GPS receiver identified in field 61 at the time identified in field 63. Miscellaneous information, such as search and rescue team identification codes or authorizations may be communicated in a field 65.

Various conventional error-free protocols could be used in the system-to-system communication of message frames 60. The data I/O port 32 provides a second data channel for communicating with external devices in a coordinate style and/or a data format message frame type can be different than that used by the data I/O port 30.

The use of waypoints and goals in GPS systems is conventional, as are the methods and computer system techniques used to compute distance-to-goal, estimated-time-of-arrival and velocity-made-good estimates from a current GPS-determined absolute position and velocity to a waypoint or goal.

Therefore, a detailed disclosure of such is unnecessary here. The present invention provides for the automatic input of absolute position, velocity and heading information and substitutes the traditional waypoint and goal positions with these data.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A GPS navigation receiver comprising, in a single integrated unit, an antenna to receive datum-free radio signals from orbiting GPS satellites, a radio frequency (RF) stage connected to said antenna to amplify and downconvert such GPS radio signals, a static random access memory (SRAM), a microprocessor (CPU) connected to said RF stage and said SRAM, a user keyboard connected to said CPU, a GPS digital signal processor (GPS-DSP) connected to said RF stage and said CPU, an input/output (I/O) interface connected to said CPU for two-way data communication with external devices and databases, a date/time-tag unit connected said CPU with GPS-week and GPS-time, a read only memory (ROM) connected to said CPU for program storage and a user liquid crystal display (LCD) connected to said CPU, wherein:

said antenna and RF stage provide for the reception of range information from orbiting GPS satellites included in said downconverted signals from said RF stage to said GPS-DSP; and said CPU is connected to the GPS-DEP and provides for decoding of said range information in said downconverted signals received and for a direct datum-free conversion of said range information a program stored in said ROM into earth-centered, earth-fixed (ECEF) position determinations which are temporarily stored in said SRAM.

2. The GPS receiver of claim 1, wherein: said CPU provides for communicating earth-centered, earth-fixed (ECEF) data to said I/O interface from said position determinations temporarily stored in said SRAM.

3. The GPS receiver of claim 1, wherein: said date/-time-tag unit provides for an association of a date and time tag with said position determinations stored in said SRAM as said position determinations are collected in real-time.

4. The GPS receiver of claim 1, wherein: said CPU provides for the generation and recognition of alphanumeric user identification codes, framing and de-framing of message packets shipping out and coming in over said I/O interface, and message protocol and error detection and correction for said message frames.

5. The GPS receiver of claim 1, wherein: said I/O interface includes a first data input/output (I/O) port and a second data input/output (I/O) port for communicating with external devices in a coordinate style and a data format message frame type that is different than that used by the first data I/O port.

6. The GPS receiver of claim 1, wherein: said I/O interface and said ROM provide for the connection of a database and an uploading of ECEF coordinate style position data from said database and conversion to latitude-longitude coordinate style expressed in the datum chosen by the user at said keyboard for display by said LCD as a waypoint and goal, and said uploaded ECEF coordinate style data is retained datum-free in its unconverted state within said SRAM together with any date-stamps or time-tags.

7. The GPS receiver of claim 6, wherein: said I/O interface and said ROM further provide for communication of a data frame comprising a plurality of fields including a user ID field that uniquely identifies said GPS receiver alphanumerically to said database, a GPS position field that communicates any navigation position fix information that has been determined by said GPS receiver, a time tag field that permits any information in another field to be dated and thus coordinated when received by any other database, a velocity field that communicates a velocity and a heading of said GPS receiver identified at a time identified in said fields, and a miscellaneous information field for team identification codes and authorizations.

8. A method of communicating earth-centered, earth-fixed (ECEF) data from a GPS receiver out over a data input/output (I/O) port, comprising the steps of:

computing a position determination in an ECEF coordinate style directly from ranging information provided by a GPS navigation receiver comprising, in a single integrated unit, an antenna connected to receive data-free radio signals from orbiting GPS satellites, a radio frequency (RF) stage connected to said antenna to amplify and down-convert such GPS radio signals, a static random access memory (SRAM), a microprocessor (CPU) connected to said RF stage and said SRAM, a user keyboard connected to said CPU, a GPS digital signal processor (GPS-DSP) connected to said RF stage and said CPU, an input/output (I/O) interface connected to said CPU for two-way data communication with external devices and databases, a date/time-tag unit connected to said CPU with GPS-week and GPS-time, a read only memory (ROM) connected to said CPU for program storage and a user liquid crystal display (LCD) connected to said CPU; time-tagging and date stamping with said date/time-tag unit each said position determination providing for later analysis and comparison;

storing said time-tagged and date-stamped position information in said SRAM as it is collected in real-time;

establishing a communication link-up through said I/O interlace to an external database; and downloading out of said SRAM the time-tagged and date-stamped ECEF data to said external database.

* * * * *